Sept. 9, 1952  M. N. YARDENY  2,610,219
RECHARGEABLE BATTERY
Filed April 4, 1950

INVENTOR.
MICHEL N. YARDENY
BY
Karl F. Ross
AGENT

Patented Sept. 9, 1952

2,610,219

UNITED STATES PATENT OFFICE 2,610,219

RECHARGEABLE BATTERY

Michel N. Yardeny, New York, N. Y., now by judicial change of name Michel N. Yardney, assignor to Yardney International Corp., New York, N. Y., a corporation of New York Application April 4, 1950, Serial No. 153,830

7 Claims. (Cl. 136—6)

The present invention relates to improvements in rechargeable batteries of the silver and zinc type, more particularly of the type disclosed in co-pending application Ser. No. 131,320, filed December 6, 1949, now Patent No. 2,601,133, issued June 17, 1952.

An important object of the present invention is to provide, in a battery of this type, means for reducing the internal resistance thereof.

Another object of this invention is to provide a battery of reduced dimensions (and weight) for a given storage capacity, or of increased storage capacity for a given size.

A further object of the invention is to provide means for increasing the number of successive charging and discharging cycles to which a battery of this description may be subjected.

In prior disclosures, such as co-pending application Ser. No. 738,702, filed by H. André on April 1, 1947, now Patent No. 2,594,709, issued April 29, 1952, it has been shown that a cell rechargeable a large number of times may be formed by juxtaposing in a container a positive silver electrode and a negative zinc electrode separated by one or more layers of cellophane and so dimensioning the container that the cellophane, when caused to swell by the addition of alkaline electrolyte, will not find room to satisfy completely its tendency to expand, thereby placing the assembly under compression such as to limit the size of the pores of the cellophane; as a result, migration of particles from one electrode to the other will be prevented and internal short circuits, so destructive of prior batteries of this general type, will be avoided.

It has been noted, however, that batteries of the type set forth were subject to relatively early deterioration believed to be due to interaction between the cellophane and the positive electrode which in the charged condition of the battery consists, at least to a large degree, of silver peroxide, a compound known to have powerful oxidizing effects.

The invention avoids the above disadvantage by replacing at least part of the cellophane wrapper surrounding the positive electrode, i. e. the part closest to the silver, with a material substantially free from reagents capable of reacting with the silver electrode.

This may be accomplished, in accordance with a feature of the present invention, by interposing one or more layers of an electrolyte-permeable material, which should be free from glycerin and formaldehyde, between the silver and the cellophane proper. A suitable material of this description is natural cellulosic paper, that is to say, paper whose cellulosic base is left in its naturally absorbent state by omitting the customary operations of glazing, sizing and the like. Paper of this character is commercially available under the trade name "Aldex." Ordinary blotting paper also fits this description.

The use of an electrolyte-permeable spacer of the character described, in combination with a reduced number of semi-permeable cellophane layers, has an additional advantage besides inhibiting any untoward rise in the internal resistance of the cell due to the causes set forth: Since the coefficient of expansion of the natural cellulosic paper, when absorbing electrolyte, is somewhat less than that of cellophane, e. g. has the numerical value of approximately 2 (i. e. the paper tends to swell to double its original thickness) as compared with a coefficient of about 3 for cellophane, the dimensions of the container or casing enclosing the assembly may be reduced without resulting in a compression of the diaphragm exceeding that at which the permeability of the cellophane is an optimum.

I have also discovered a method of further reducing the internal resistance of the cell by amalgamating the zinc of the negative electrode. Such amalgamation has already been proposed in the case of zinc foils, but has not heretofore been used, as far as I am aware, in a cell whose negative electrode consists of powdered zinc (or powdered zinc oxide in the discharged condition of the cell). I have found that effective amalgamation may be obtained, in an electrode of this character, by admixing with the zinc oxide powder a quantity of mercuric oxide, preferably in its highly pulverulent, yellow form, a ratio of 4½ parts of HgO to 100 parts of ZnO having proved highly satisfactory. Ratios as high as 10% HgO, per weight of zinc oxide, have been found to be suitable. This method and an electrode so constituted are claimed in a divisional application, Ser. No. 288,556, filed May 17, 1952.

Reference is now made to the accompanying drawing for a better understanding of the invention. In the drawing.

Figure 3:
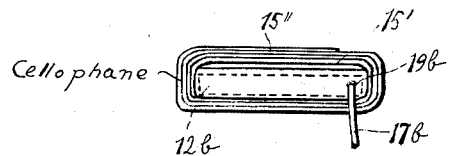
Fig. 3 is a side elevation of this element in a further stage of formation.
Figure 4:
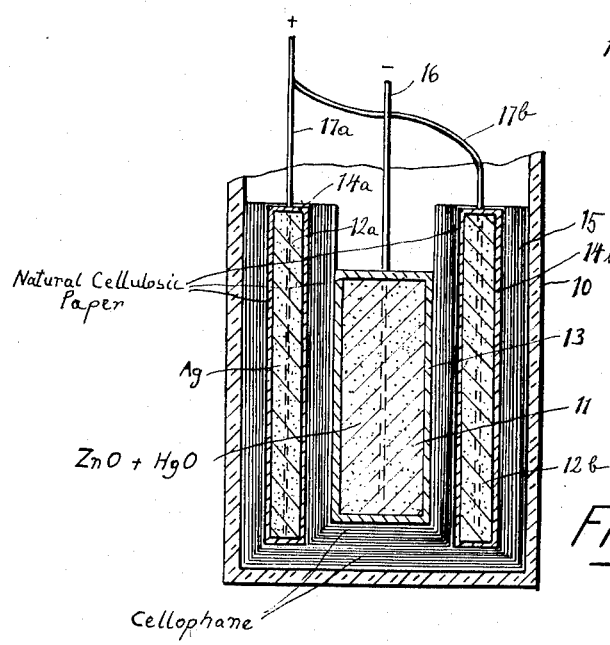
Fig. 4 is a cross section, on a larger scale, through a battery casing and a complete electrode assembly, according to the present improvement, inserted therein.

Referring first to Fig. 4 for a description of the various elements of my improved battery and the relative arrangement thereof, there is shown a rigid casing 10 containing a negative electrode 11 flanked by two positive electrodes 12a, 12b. The negative electrode is separated from each of the two positive electrodes by three diaphragms, including a negative wrapper 13 and positive wrappers 14a, 14b of relatively high permeability, i. e. of natural cellulosic paper as defined above, and an inter-electrode spacer 15 of relatively low permeability, i. e. of cellophane. The wrappers 13, 14 are each shown as consisting only of a single layer, whereas the spacer 15 comprises a number of layers formed by a process which will be described with reference to Figs. 1–3. A negative lead 16 projects from the electrode 11 while positive leads 17a, 17b, merging with each other, project from the two positive electrode portions 12a, 12b, respectively.

Figure 1:
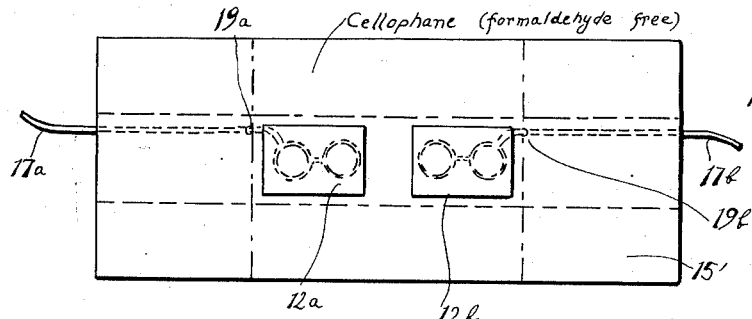
Fig. 1 is a plan view of a positive electrode element in a first stage of formation thereof.

Fig. 1 shows a rectangular strip of cellophane 15' upon which there are disposed, in spaced-apart relation, the two positive electrode portions 12a, 12b each in its wrapper of natural cellulosic paper (not shown in Fig. 1). Horizontal and vertical dot-dash lines indicate where the strip 15' is subsequently folded about these electrode portions to produce the envelope shown in Fig. 2 from which project the leads 17a, 17b, these leads passing through holes 19a, 19b which are made in the strip 15' and through which pass the vertical lines of fold.

After the folding of the envelope 15' has been completed, another strip 15" of cellophane is wrapped about the former as clearly shown in Fig. 3. The two strips 15', 15", together forming the diaphragm or spacer 15 and enclosing the electrode portions 12a, 12b with their wrappers 14a, 14b, are then bent into U-shape to form the positive element shown in Fig. 4 which enfolds the negative element 11, 13. It will be noted that in contradistinction to prior arrangements, such as disclosed, for example, in co-pending applications Ser. Nos. 66,291 and 98,433 by H. André, filed December 20, 1948 and June 11, 1949, respectively, now Patents Nos. 2,594,710 and 2,594,712, issued April 29, 1952, the bight or center portion of the U contains no active electrode material, the latter being divided between the positive electrode portions 12a and 12b located in the two arms thereof. It has been found, rather surprisingly, that the reduction in output due to the elimination of the active material from part of the positive element is trivial when compared with the resulting economies in silver, space and weight, so that a considerable increase in specific output, per unit of weight or size, was achieved. If, furthermore, a cellophane substantially free from plasticizer is used, the greater brittleness of the latter is of no consequence inasmuch as any cracking of the diaphragm 15, due to bending of the assembly into U-shape, will occur at non-vital points only.

In this connection it may be mentioned that the formation of the positive, or outer, electrode element in the manner described above has been found conducive to a further reduction in the internal resistance of the cell, as compared with electrode assemblies wherein, as previously proposed, the U-shaped electrode has an inner wrapping similar to the wrapping 15" surrounded by an outer envelope of the character shown at 15'. The reasons for this advantageous result are not entirely clear but are believed to reside, at least in part, in the better over-all contact between the cellophane and the body of the electrode which is obtainable by virtue of the present arrangement, entailing a substantial elimination of undesirable air pockets between the electrode body and the wrappings surrounding it.

Figure 5:
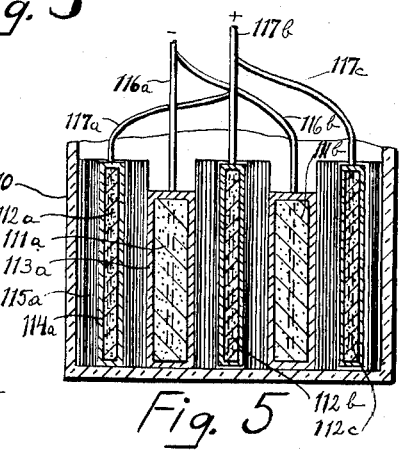
Fig. 5 is a cross sectional view similar to Fig. 4, showing a modification.

It should be understood that the invention is not limited to the specific embodiment shown and described; thus it is to be noted that the positions of the positive and negative electrodes in a battery as described may be interchanged, so that the negative electrode is given U-shaped configuration and enfolds the positive electrode, and that certain of the advantages enumerated above may also be obtained in a battery such as shown in Fig. 5, in which a series of flat electrodes, of alternating polarity, are disposed side by side.

Figure 2:
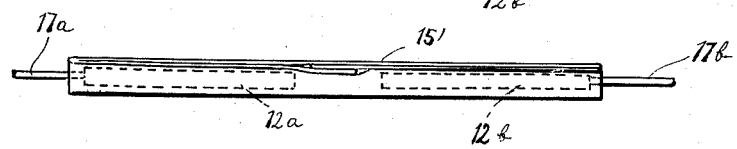
Fig. 2 is a front elevation of the same element in an advanced stage of formation.

Each of the positive electrodes 112a, 112b, 112c of Fig. 5 is formed in accordance with the procedure explained with reference to Figs. 1 through 3 in connection with corresponding electrodes 12a, 12b. Since, however, the positive electrode pads of Fig. 5 are not folded into U-shape, only one electrode, such as 12a or 12b in Fig. 4, is included in each cellophane wrapper. Negative electrodes 111a and 111b are respectively interposed between positive electrodes 112a, 112b and 112b, 112c, negative leads 116a, 116b merging with each other, and positive leads 117a, 117b, 117c likewise merging with each other. Each electrode is encased in a layer of natural cellulosic paper such as 113a or 114a, each positive layer being further provided with an outer layer of cellophane, such as 115a, composed of a folded envelope and a wound wrapping similar to members 15' and 15" of Fig. 3, the entire assembly being mounted within a rigid casing 110. The functions of the various components are identical with those explained in connection with the corresponding elements illustrated in Fig. 4, the aforementioned correspondence being indicated by similar reference numerals prefixed by an initial hundreds digit.

What I claim as novel, and desire to secure by Letters Patent, is:

1. In a battery, in combination, a casing, at least one positive electrode and at least one negative electrode in said casing, at least said positive electrode containing a strong oxidizing agent in the charged condition of the battery, and diaphragm means separating said electrodes, said diaphragm means including at least one first sheet of semi-permeable material and at least one second sheet of permeable material interposed between said first sheet and said positive electrode, thereby protecting said semi-permeable material from oxidation by said agent.

2. In a battery, the combination according to claim 1 wherein said second sheet consists of natural cellulosic paper.

3. In a battery, the combination according to claim 1 wherein said first sheet consists of cellophane.

4. In a battery, the combination according to claim 1 wherein said second sheet is substantially free from glycerin.

5. In a battery, in combination, a casing, at least one positive electrode and at least one negative electrode in said casing, at least said positive electrode containing a strong oxidizing agent in the charged condition of the battery, and diaphragm means separating said electrodes, said diaphragm means including at least one first sheet of cellophane and at least one second sheet of natural cellulosic paper interposed between said first sheet and said positive electrode, thereby protecting said cellophane from oxidation by said agent.

6. In a battery, the combination according to claim 5 wherein said positive electrode contains silver.

7. In a battery, the combination according to claim 3 wherein said cellophane is substantially free from formaldehyde.

MICHEL N. YARDENY.

REFERENCES CITED

The following references are of record in the file of this patent:

UNITED STATES PATENTS

| Number | Name | Date |
| --- | --- | --- |
| 309,939 | Faure | Dec. 30, 1884 |
| 425,335 | Marx | Apr. 8, 1890 |
| 428,684 | Mason | May 27, 1890 |
| 440,173 | MacDonald | Nov. 11, 1890 |
| 1,955,115 | Drum | Apr. 17, 1934 |
| 2,317,711 | Andre | Apr. 27, 1943 |